United States Patent
Tanaka

(10) Patent No.: US 12,536,997 B2
(45) Date of Patent: Jan. 27, 2026

(54) INFORMATION PROCESSING DEVICE AND INFORMATION PROCESSING METHOD

(71) Applicant: Saturn Licensing LLC, New York, NY (US)

(72) Inventor: Teruyuki Tanaka, Kanagawa (JP)

(73) Assignee: SATURN LICENSING LLC, New York, NY (US)

( * ) Notice: Subject to any disclaimer, the term of this patent is extended or adjusted under 35 U.S.C. 154(b) by 282 days.

(21) Appl. No.: 17/419,537

(22) PCT Filed: Dec. 19, 2019

(86) PCT No.: PCT/JP2019/049762
§ 371 (c)(1),
(2) Date: Jun. 29, 2021

(87) PCT Pub. No.: WO2020/145071
PCT Pub. Date: Jul. 16, 2020

(65) Prior Publication Data
US 2022/0084518 A1    Mar. 17, 2022

(30) Foreign Application Priority Data
Jan. 7, 2019  (JP) ................................. 2019-000497

(51) Int. Cl.
*G10L 15/22*  (2006.01)
(52) U.S. Cl.
CPC ........ *G10L 15/22* (2013.01); *G10L 2015/223* (2013.01)
(58) Field of Classification Search
USPC ..................................................... 704/1–504
See application file for complete search history.

(56) References Cited

U.S. PATENT DOCUMENTS

| | | | |
|---|---|---|---|
| 8,793,138 B2 * | 7/2014 | Cho | G06F 3/167 704/275 |
| 11,055,356 B2 * | 7/2021 | Ritchey | G06N 20/00 |
| 11,128,636 B1 * | 9/2021 | Jorasch | H04W 12/08 |
| 11,544,591 B2 * | 1/2023 | Paulina | G16H 20/70 |
| 11,579,749 B2 * | 2/2023 | Ni | H04L 12/282 |

(Continued)

FOREIGN PATENT DOCUMENTS

| EP | 3382949 A1 | 10/2018 |
|---|---|---|
| JP | 2009109587 | 5/2009 |

(Continued)

OTHER PUBLICATIONS

International Search Report for PCT/JP2019/049762 mailed Mar. 3, 2020; 3 pages.

*Primary Examiner* — Marcus T Riley
(74) *Attorney, Agent, or Firm* — Richard LaPeruta

(57) ABSTRACT

A user is assisted in performing a voice operation appropriately.

A situation determination section determines a situation. A state control section controls a voice command appropriate for the determined situation to put the voice command into a receivable state. For example, the user is informed of what the voice command in a receivable state is, by means of display or voice output. The user can utter a voice command without performing a user action to prevent false recognition, such as the utterance of a wake word. This reduces the troublesomeness and burden of the user.

20 Claims, 10 Drawing Sheets

(56) References Cited

U.S. PATENT DOCUMENTS

| | | | |
|---|---|---|---|
| 11,672,479 B2* | 6/2023 | Jorasch | A61B 5/7203 |
| | | | 726/7 |
| 11,676,586 B2* | 6/2023 | Robert Jose | G10L 15/22 |
| | | | 704/251 |
| 11,676,595 B2* | 6/2023 | Igarashi | H04N 21/4722 |
| | | | 704/251 |
| 11,693,533 B2* | 7/2023 | Ni | H04L 67/51 |
| | | | 704/275 |
| 11,771,866 B2* | 10/2023 | D'Amato | A61N 1/37518 |
| | | | 704/275 |
| 11,957,486 B2* | 4/2024 | Jorasch | G16H 80/00 |
| 12,027,169 B2* | 7/2024 | Robert Jose | G06F 3/14 |
| 2013/0253937 A1* | 9/2013 | Cho | G10L 15/22 |
| | | | 704/275 |
| 2014/0130101 A1* | 5/2014 | Yoshitani | H04N 21/47 |
| | | | 725/38 |
| 2016/0271490 A1* | 9/2016 | Tamura | A63F 13/48 |
| 2017/0289766 A1* | 10/2017 | Scott | H04W 8/005 |
| 2018/0074785 A1* | 3/2018 | Ohmura | G06F 3/0487 |
| 2018/0121162 A1* | 5/2018 | Ueno | G06F 3/0304 |
| 2018/0144615 A1* | 5/2018 | Kinney | G07C 9/00571 |
| 2020/0258515 A1* | 8/2020 | Suzuki | G06F 3/01 |
| 2021/0174795 A1* | 6/2021 | Robert Jose | G06F 3/167 |
| 2021/0201904 A1* | 7/2021 | Igarashi | G10L 15/22 |
| 2022/0006813 A1* | 1/2022 | Jorasch | G16H 50/30 |
| 2022/0084518 A1* | 3/2022 | Tanaka | G10L 15/22 |
| 2023/0260514 A1* | 8/2023 | Robert Jose | G06F 3/14 |
| | | | 704/251 |
| 2024/0321275 A1* | 9/2024 | Robert Jose | G06F 3/14 |
| 2025/0266041 A1* | 8/2025 | Robert Jose | G10L 15/22 |

FOREIGN PATENT DOCUMENTS

| | | | | |
|---|---|---|---|---|
| JP | 2015501022 A | | 1/2015 | |
| JP | 2015055718 A | | 3/2015 | |
| JP | 2018073067 A | | 5/2018 | |
| JP | 7452528 B2 * | | 3/2024 | G06F 3/167 |
| WO | WO2013048880 A1 | | 4/2013 | |

* cited by examiner

CASE 1

CASE 2

INFORMATION PROCESSING DEVICE AND INFORMATION PROCESSING METHOD

CROSS-REFERENCE TO RELATED APPLICATIONS

This application is a national phase entry under 35 U.S.C. § 371 of International Application No. PCT/JP2019/049762 filed Dec. 19, 2019, which claims the priority from Japanese Patent Application No. 2019-000497 filed in the Japanese Patent Office on Jan. 7, 2019, the entire contents of which are hereby incorporated by reference.

TECHNICAL FIELD

The present technology relates to an information processing device and an information processing method. More specifically, the present technology relates to an information processing device and an information processing method which are suitable for being applied to voice-enabled apparatuses including smart TVs and smart speakers.

BACKGROUND ART

In general, in a voice-enabled apparatus, such as a smart TV or a smart speaker, reception of a voice command from the user requires the user to perform a user action, such as uttering a specific wake word (which may also be called a "hot word," a "startup word," or the like) or pressing down a specific button.

Such a user action is required in order to treat, as a voice command, only a voice uttered immediately after the user action to prevent false recognition of a user's utterance in daily conversation, as a voice command. However, it is troublesome and burdensome for the user to be forced to perform a user action every time uttering a voice command.

For example, PTL 1 discloses a technology for starting reception of a voice command on the basis of information concerning the position of a user's line of sight on a display screen in a case where the user is determined to have looked at a predetermined object. In this case, the action of the user looking at the predetermined object, which is an alternative to the above-mentioned utterance of a specific wake word or pressing down of a specific button, is also troublesome and burdensome for the user.

CITATION LIST

Patent Literature

[PTL 1]
Japanese Patent Laid-open No. 2015-055718

SUMMARY

Technical Problem

In order to reduce the troublesomeness and burden of the user, enabling utterance of a voice command without the user action has been desired.

An object of the present technology is to enable the user to perform a voice operation appropriately.

Solution to Problem

A concept of the present technology is to provide an information processing device including a control section that controls a process of determining a situation, to put a voice command appropriate for the determined situation into a receivable state.

In the present technology, the control section controls the process of determining a situation. Subsequently, the control section puts a voice command appropriate for the determined situation into a receivable state. For example, the information processing device may further include a command executor that executes an inputted voice command in a case that the voice command is appropriate for the situation.

For example, the control section may control determination of a situation of an application function, and the situation may be the determined situation of the application function. As a result, the voice command appropriate for the situation of the application function is automatically put into a receivable state. In this case, the application function may be an application function of, for example, a smart television or a smart speaker.

Moreover, the information processing device may further include, for example, a sensor section, and the situation may be a situation acquired by the sensor section. As a result, the voice command appropriate for the situation acquired by the sensor section is automatically put into a receivable state. In this case, for example, the sensor section may include a camera. In addition, in this case, for example, the situation may be a situation of a user.

Further, for example, the information processing device may further include a communicator that communicates with an external apparatus, and the situation may be a situation acquired by the external apparatus. As a result, the voice command appropriate for the situation acquired by the external apparatus is automatically put into a receivable state.

Thus, in the present technology, control is performed such that a voice command appropriate for a determined situation is put into a receivable state. This enables the user to utter a voice command without performing a user action to prevent false recognition, and reduces the troublesomeness and burden of the user.

Further, according to the present technology, the information processing device may further include, for example, a command notifier that notifies a user of the voice command appropriate for the situation. This enables the user to properly utter a voice command appropriate for the situation.

DESCRIPTION OF EMBODIMENT

An embodiment to carry out the invention (hereinafter, referred to as an "embodiment") will now be described as follows. The description will be given in the following order.
  1. Embodiment
  2. Application to Mobile Body
  3. Modified Example 1. Embodiment

[Example of Configuration of Information Processing System]

Figure 1:
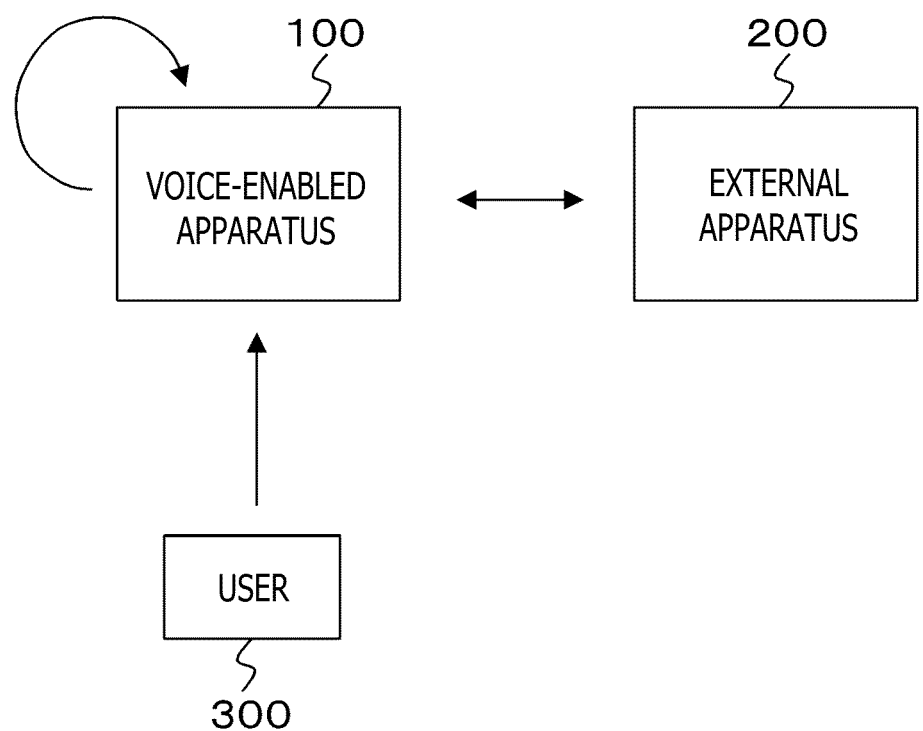
FIG. 1 is a block diagram depicting an overview of an example of an information processing system as an embodiment.

FIG. 1 illustrates an overview of an example of an information processing system 10 as an embodiment. In this example, the information processing system 10 includes a voice-enabled apparatus 100, and also includes an external apparatus 200, for example, an IoT (Internet of Things) apparatus, that can communicate with the voice-enabled apparatus 100.

The voice-enabled apparatus 100 is an electronic apparatus that can be operated by a voice command uttered by a user 300. Specific examples of the voice-enabled apparatus 100 include smart TVs and smart speakers. Here, a smart TV has been achieved by making smart a traditional TV. For example, a smart TV has such features as being able to acquire various kinds of information via the Internet and being able to be connected to another apparatus via a network so as to achieve inter-apparatus coordination. Meanwhile, a smart speaker has been achieved by making smart a traditional speaker and is capable of using an interactive, voice-enabled AI (Artificial Intelligence) assistant. Incidentally, a smart TV can also use an interactive, voice-enabled AI assistant on a standalone basis.

The external apparatus 200 can be, for example, a security camera or an illuminator, and can also be a microwave oven, a vacuum cleaner, an air conditioner, a washing machine, a refrigerator, etc. The voice-enabled apparatus 100 and the external apparatus 200 communicate in a wired or wireless manner. Examples of wireless networks include "Wi-Fi" and "Bluetooth." Both "Wi-Fi" and "Bluetooth" are registered trademarks.

The voice-enabled apparatus 100 determines a situation and goes into a state of being able to receive a voice command appropriate for the determined situation. In a case where a voice command received from the user 300 is appropriate for the situation, the voice-enabled apparatus 100 executes the voice command. In this case, the user 300 can utter the voice command without performing a user action for prevention of false recognition, for example, the utterance of a wake word. This reduces the troublesomeness and burden of the user.

The voice-enabled apparatus 100 can, for example, determine the situation of the application function section owned by the voice-enabled apparatus 100 and go into a state of being able to receive a voice command appropriate for the determined situation. In a case where the voice-enabled apparatus 100 is, for example, a smart TV, the application function section can be a TV reception function section, a mail function section, an Internet connection function section, an information display function section, etc. Meanwhile, in a case where the voice-enabled apparatus 100 is, for example, a smart speaker, the application function section can be a voice output function section, a mail function section, an Internet connection function section, an information display function section, etc.

Further, the voice-enabled apparatus 100 can, for example, go into a state of being able to receive a voice command appropriate for a situation (information concerning a user or external environment) acquired by a sensor section owned by the voice-enabled apparatus 100. Examples of the sensor section include a temperature sensor, a humidity sensor, a motion sensor, a distance sensor, and a proximity sensor, and further include a camera (image sensor) and a microphone. For example, any of a camera, a microphone, and a motion sensor can be used to obtain the situation of a user.

Further, the voice-enabled apparatus 100 can, for example, go into a state of being able to receive a voice command appropriate for a situation (information concerning a user or external environment) acquired by the external apparatus 200. Incidentally, the external apparatus 200 can be an apparatus for acquiring a situation, an apparatus controlled by execution of a voice command, or an apparatus having both of the functions.

The situations mentioned in the above description are as follows: the situation of the application function section; the situation acquired by the sensor section owned by the voice-enabled apparatus 100; and the situation acquired by the external apparatus. However, situations to be used are not limited to these. Further, besides going into a state of being able to receive a voice command appropriate for these individual situations, the voice-enabled apparatus 100 can go into a state of being able to receive a voice command appropriate for a comprehensive situation combining some or all of the individual situations.

In addition, when having gone into a state of being able to receive a voice command appropriate for a situation, the voice-enabled apparatus 100 informs the user 300 which voice command the voice-enabled apparatus 100 can receive. In this case, the user is informed of the receivable voice commands by display on the display in a visually recognizable manner, by voice output from the speaker in an auditorily recognizable manner, or by both. Thus informing the user about receivable voice commands enables the user to properly utter a voice command appropriate for the situation.

However, the receivable voice commands which the user is informed of may not contain the voice command that the user intends to utter. In such a case, the user can perform such a user action as the utterance of a wake word first and then utter the intended voice command, thereby achieving a desired voice operation.

Figure 2:
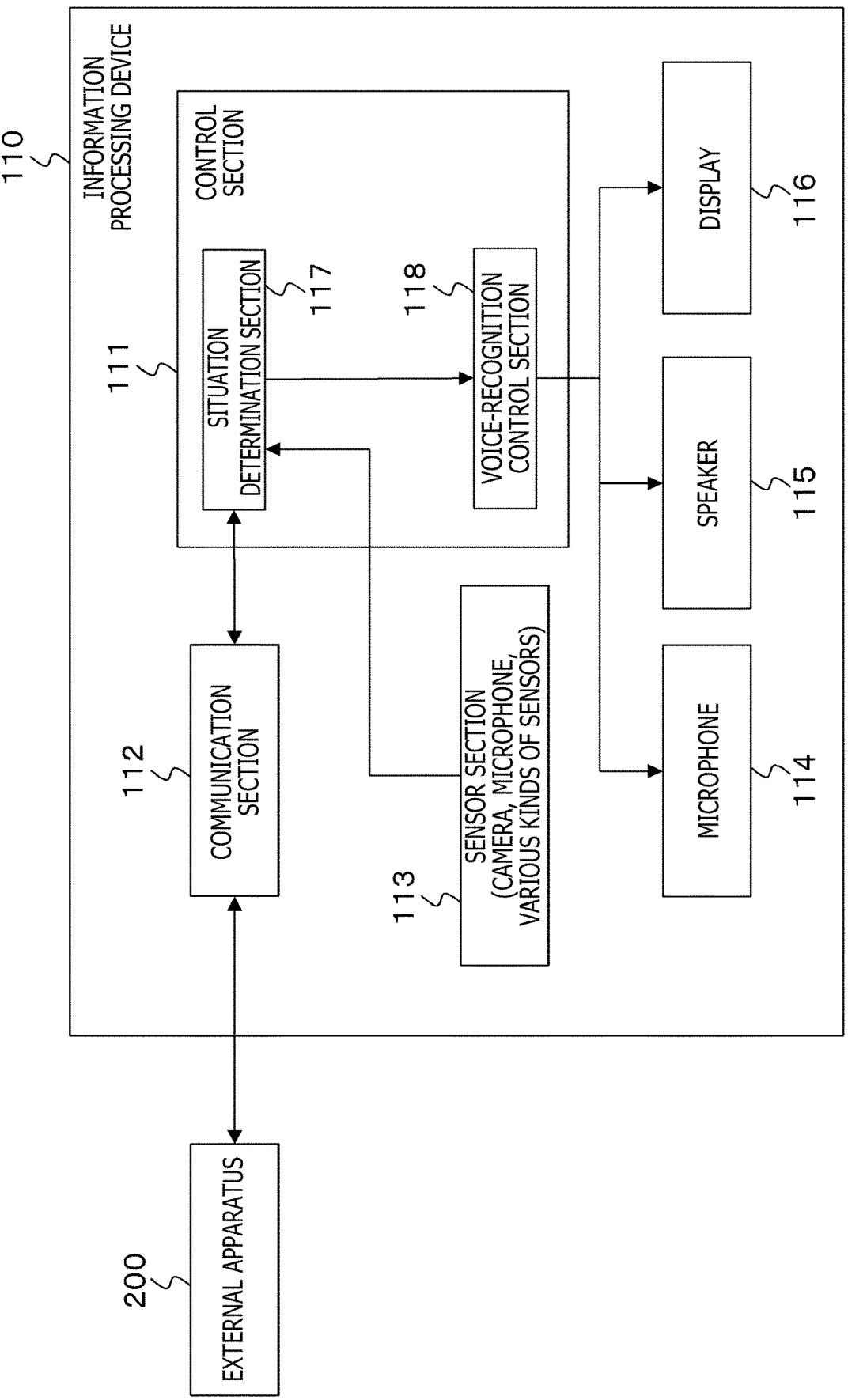
FIG. 2 is a block diagram depicting an example of a configuration of an information processing device included in a voice-enabled apparatus.
Figure 3:
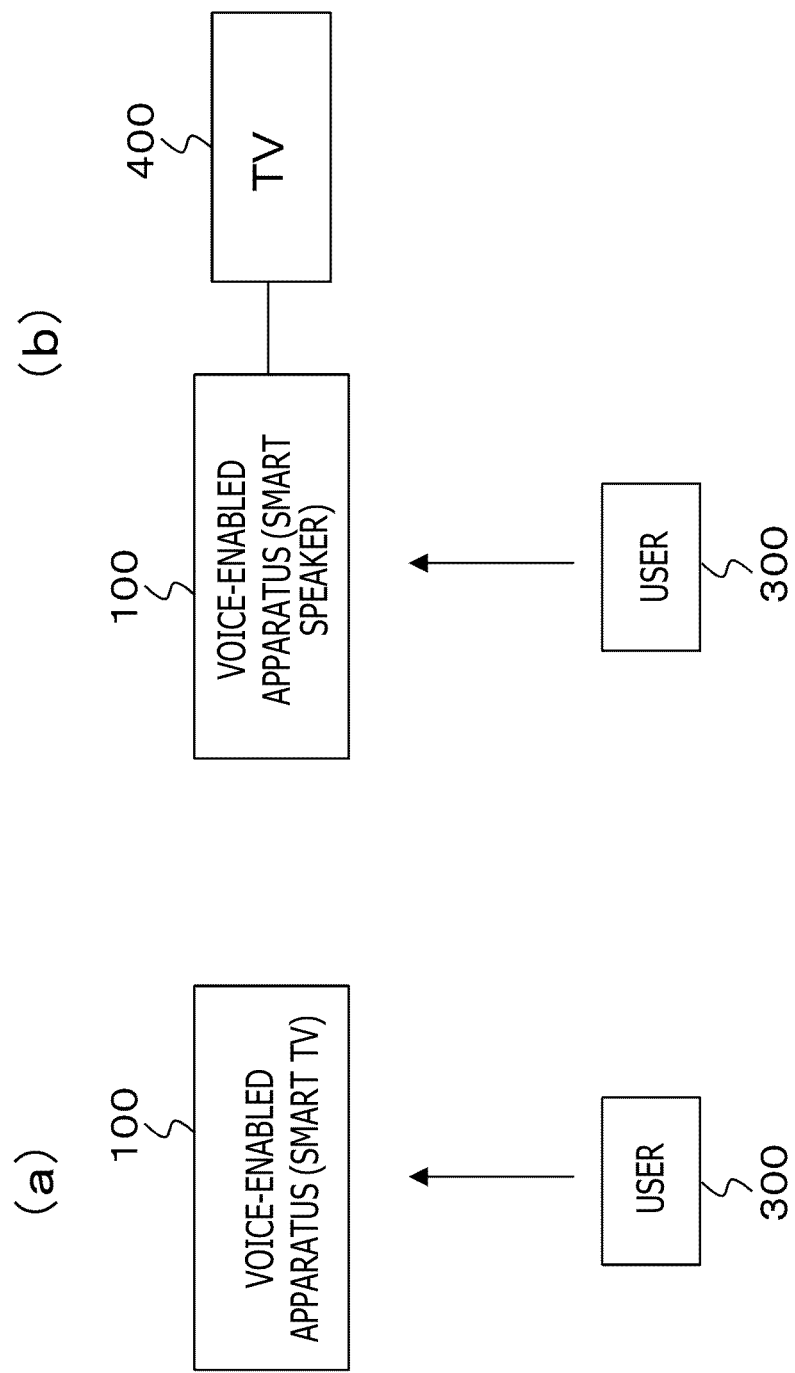
FIG. 3 depicts diagrams illustrating an example of a configuration in which the voice-enabled apparatus is a smart TV or a smart speaker.

FIG. 2 illustrates an example of a configuration of an information processing device 110 included in the voice-enabled apparatus 100. The information processing device 110 includes a control section 111, a communication section 112, a sensor section 113, a microphone 114, a speaker 115, and a display 116. This example, which includes the display 116, assumes, for example, that the voice-enabled apparatus 100 is a smart TV as illustrated in FIG. 3(a). Meanwhile, in a case that the voice-enabled apparatus 100 is assumed to be a smart speaker as illustrated in FIG. 3(b), a possible configuration is that an external television set (or a monitor or a projector) 400 has functions of the display 116. Alternatively, the smart speaker 100 itself may have the functions of the display 116, such as a projector.

Referring back to FIG. 2, the communication section 112 communicates with the external apparatus 200. The sensor section 113 includes a camera, a microphone, and other various kinds of sensors. Incidentally, the microphone included in the sensor section 113 can be replaced by the microphone 114 or a microphone mounted in an operating apparatus, such as a remote control or a smart phone. In this case, the process of receiving a voice command at the microphone mounted in the remote control or the microphone 114 can be started, for example, by the pressing down of a specific button on the remote control that can operate the voice-enabled device 100 with use of infrared rays. Alternatively, a similar process can be started by selection of a specific icon image displayed on the display section of a smartphone. Further alternatively, a constitution not including a camera or a microphone is possible.

The control section 111 controls the entirety of the information processing device 110. The control section 111 includes a situation determination section 117 and a voice-recognition control section 118. Situation information acquired by the external apparatus 200 is given to the situation determination section 117 of the control section 111 via the communication section 112. Meanwhile, situation information acquired by the sensor section 113 is given to the situation determination section 117 of the control section 111. Note that the control section 111 is always aware of the situation of the application function section owned by the voice-enabled apparatus 100. Incidentally, the situation information is given to the situation determination section 117.

The situation determination section 117 determines, on the basis of the situation information given from each section, the situation of the application function section, the situation acquired by the sensor section, and the situation acquired by the external apparatus. The voice-recognition control section 118 selects a voice command appropriate for the situation determined by the situation determination section 117 and puts the voice command into a receivable state.

At this time, the voice-recognition control section 118 performs control to inform the user 300 which voice command the voice-enabled apparatus 100 can receive. In this case, the voice command is, for example, displayed by the display 116 or outputted as a voice from the speaker 115.

Further, the voice-recognition control section 118 recognizes the utterance of a voice command input through the microphone 114 and, in a case that the voice command is appropriate for the situation, performs control to execute the voice command. In this case, if necessary, control information is sent to the external apparatus 200 via the communication section 112. In addition, it is also possible to adopt a configuration in which some of the processes in the information processing device 110, for example, a voice recognition process, is performed by an unillustrated cloud server.

Figure 4:
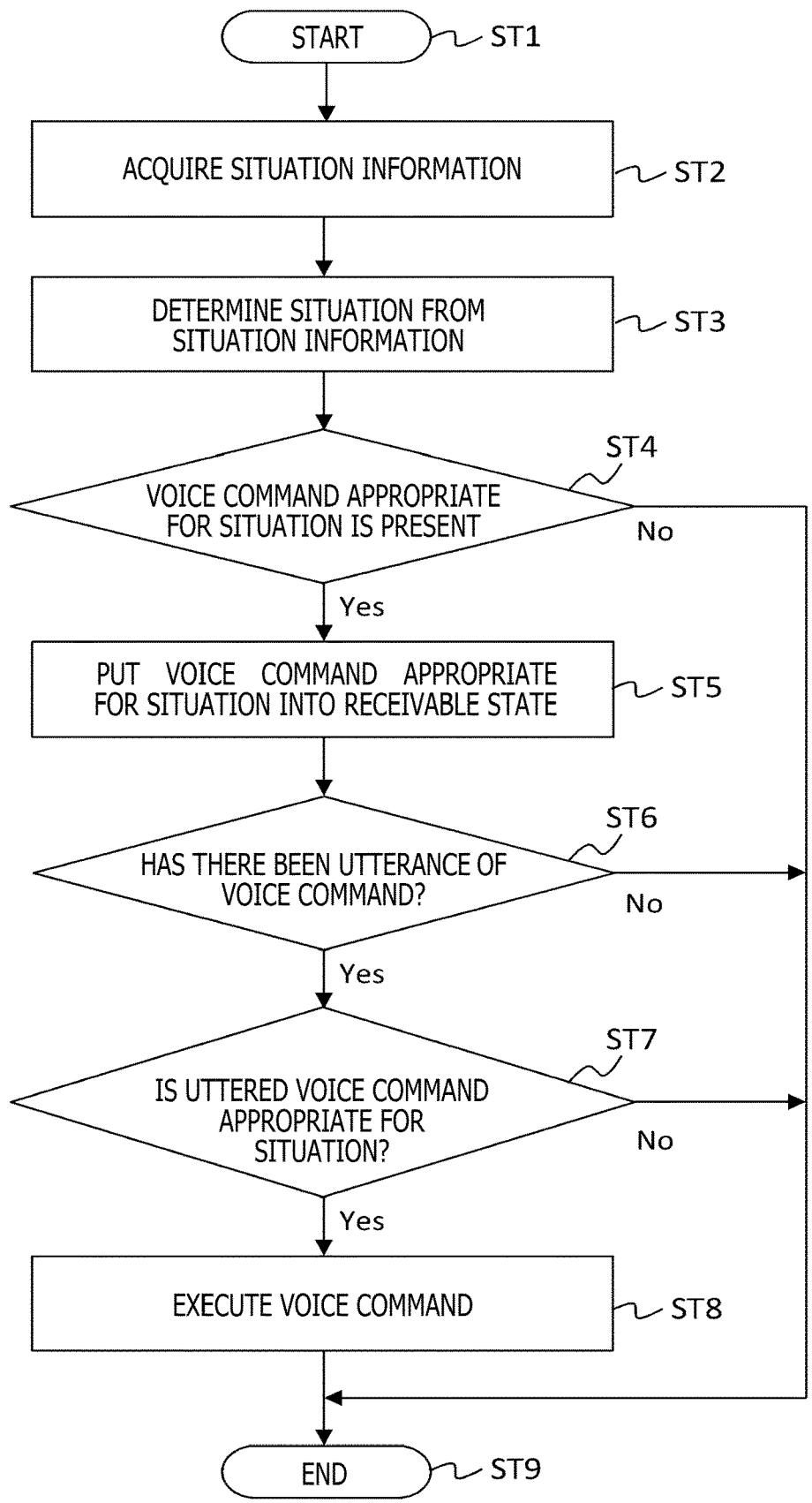
FIG. 4 is a flowchart depicting an example of a procedure in a control section of the information processing device.

A flowchart in FIG. 4 illustrates an example of a procedure in the control section 111 of the information processing device 110. The control section 111 performs the process of the flowchart periodically. In Step ST1, the control section 111 starts the process.

Next, in Step ST2, the control section 111 acquires situation information. In this case, the control section 111 acquires at least one of the following: the situation information of the application function section; the situation information from the sensor section 113; and the situation information from the external apparatus 200.

Then, in Step ST3, the control section 111 determines the situation based on the situation information. Subsequently, in Step ST4, the control section 111 determines, from the determined situation, whether or not a voice command appropriate for the situation is present. When the voice command appropriate for the situation is present, in Step ST5, the control section 111 puts the voice command appropriate for the situation into a receivable state and informs the user of it by means of display or voice output.

Following this, in Step ST6, the control section 111 determines whether or not utterance of a voice command has been made. If utterance of a voice command has been made, in Step ST7, the control section 111 determines whether or not the uttered voice command is appropriate for the situation, or in other words, whether or not the uttered voice command is a receivable voice command.

When the uttered voice command is appropriate for the situation, in Step ST8, the control section 111 executes the voice command. Then, subsequent to the process of Step ST8, the control section 111 terminates the process in Step ST9.

Meanwhile, when no voice command appropriate for the situation is present in Step ST4, when no utterance of a voice command is made in Step ST6, or when the voice command uttered is not appropriate for the situation in Step ST7, the control section 111 terminates the process in Step ST9. Alternatively, in these cases, the control section 111 may perform a process of informing the user about voice commands appropriate for the situation before terminating the process in Step ST9.

Next, specific cases will be described as follows. Here, the following four cases will be considered.

[Case 1]

The case 1 is a case where the voice-enabled apparatus 100 determines the situation from only information owned by itself. The case 1 is a case where a change in the situation of the application function of the voice-enabled apparatus 100 has been detected, so that the user is expected to execute a next action with use of a voice command. In the case 1, the information processing device 110 determines the situation of the application function section and goes into a state of being able to receive a voice command appropriate for the determined situation.

Figure 5:
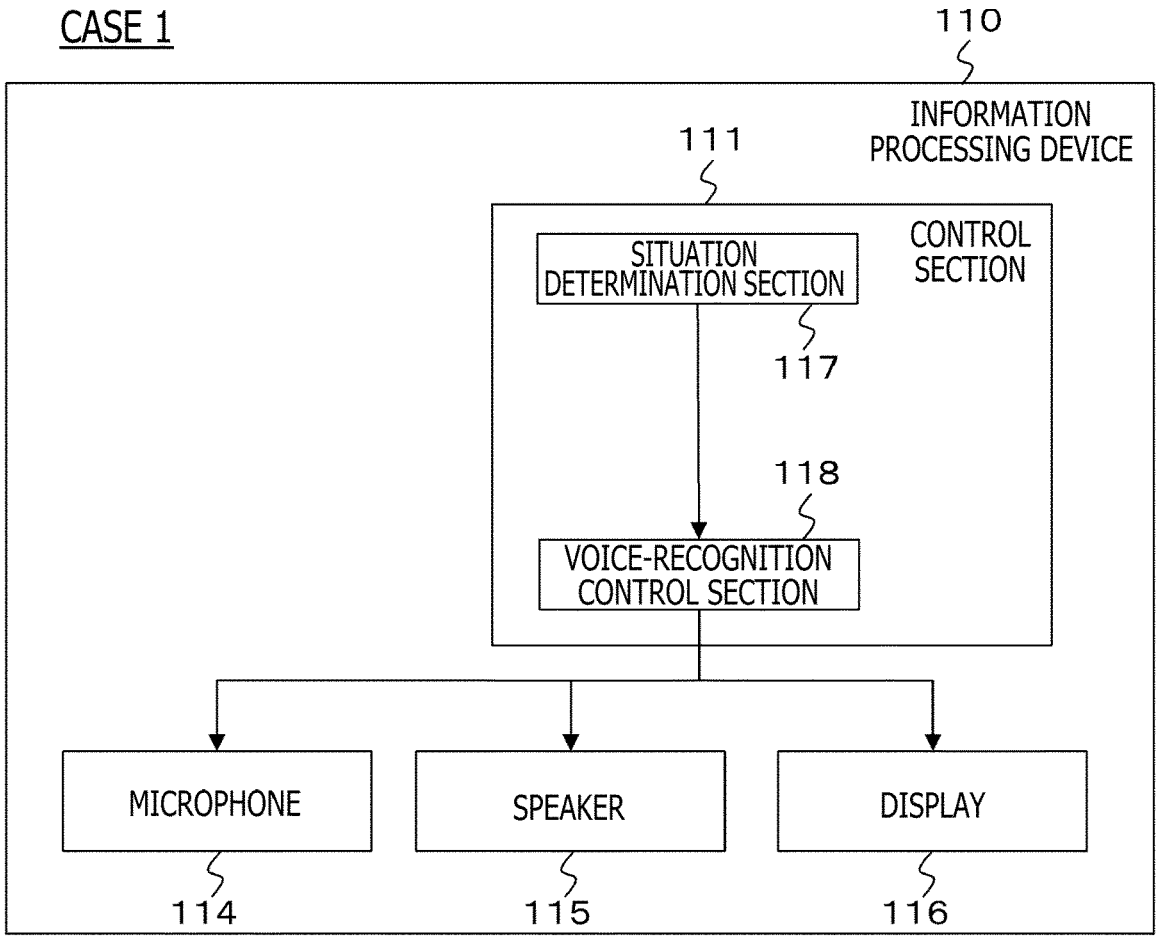
FIG. 5 is a block diagram depicting an example of a configuration of an information processing device corresponding to a case 1.

FIG. 5 illustrates an example of a configuration of the information processing device 110 corresponding to the case 1. The information processing device 110 includes the control section 111, the microphone 114, the speaker 115, and the display 116. In FIG. 5, the components corresponding to those illustrated in FIG. 2 are denoted by the same reference signs, and detailed description of these components will be omitted. The case 1 does not use the communication section 112 and the sensor section 113 included in the information processing device 110 illustrated in FIG. 2.

The case 1 can be any of the following use cases.

(1) A case where the arrival of a new mail has been detected (information acquired by the application function of the apparatus), so that the user is expected to read the mail body.

(2) A case where that the time is nine o'clock has been detected (information acquired by the application function of the apparatus), so that the user is expected to display a TV program screen and change the channel.

Figure 6:
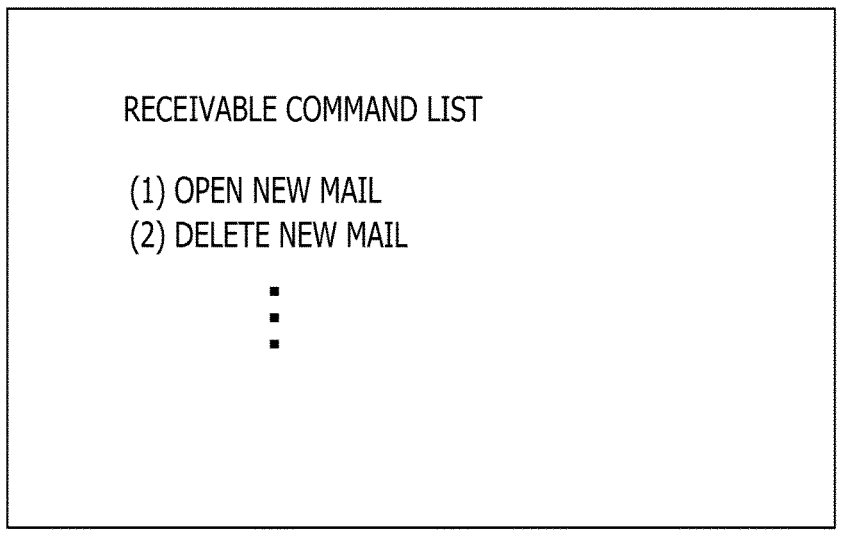
FIG. 6 is a diagram depicting an example of a list of receivable voice commands displayed on a display.

In the use case (1), a probable voice command appropriate for the situation is, for example, "Open the new mail." Meanwhile, in the use case (2), a probable voice command is, for example, "Display the TV program," followed by "Change to such-and-such TV show." Furthermore, FIG. 6 illustrates an example of a list of receivable voice commands displayed on the display 116 in the use case (1).

[Case 2]

The case 2 is a case where the voice-enabled apparatus 100 determines the situation with use of the camera or various kinds of sensors owned by the voice-enabled apparatus 100. The case 2 is a case where a change in the situation of the user or external environment has been detected from information acquired by the camera or various kinds of sensors owned by the voice-enabled apparatus 100, so that the user is expected to execute a next action with use of a voice command. In the case 2, the information processing device 110 determines the situation acquired by the sensor section 113 and goes into a state of being able to receive a voice command appropriate for the determined situation.

Figure 7:
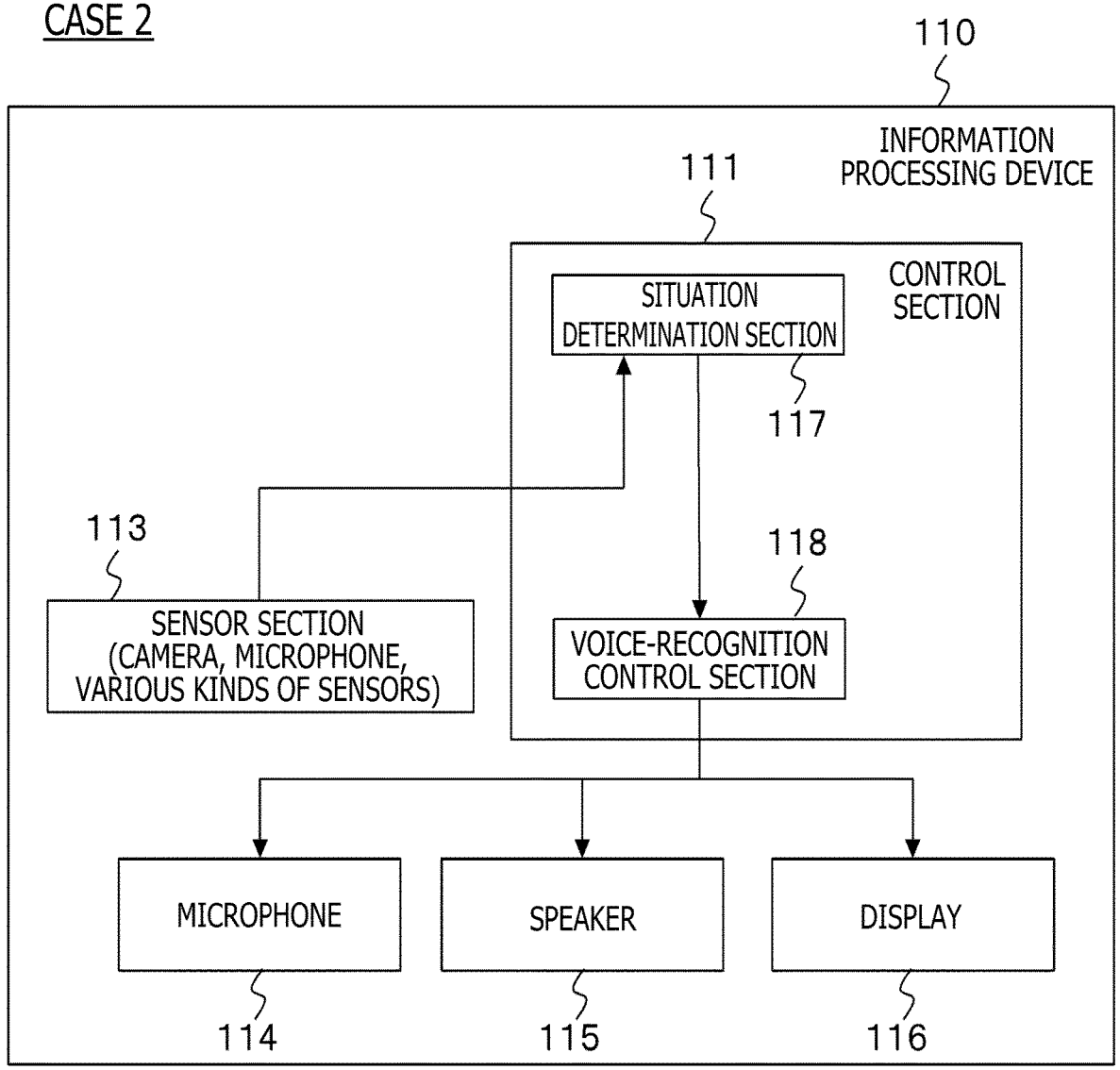
FIG. 7 is a block diagram depicting an example of a configuration of an information processing device corresponding to a case 2.

FIG. 7 illustrates an example of a configuration of the information processing device 110 corresponding to the case 2. The information processing device 110 includes the control section 111, the sensor section 113, the microphone 114, the speaker 115, and the display 116. In FIG. 7, the components corresponding to those illustrated in FIG. 2 are denoted by the same reference signs, and detailed description of these components will be omitted. The case 2 does not use the communication section 112 included in the information processing device 110 illustrated in FIG. 2.

The case 2 can be any of the following use cases.

(1) A case where it has been detected that the user has sat in front of the TV (information acquired by the camera owned by the apparatus itself), so that the user is expected to turn on the power of the apparatus.

(2) A case where it has been detected from the information acquired by the distance sensor that the user has moved farther away from the device, so that the user is predicted to change the font size.

In the use case (1), a probable voice command appropriate for the situation is, for example, "Turn on the TV." Meanwhile, in the use case (2), a probable voice command appropriate for the situation is, for example, "Make the font size bigger."

[Case 3]

The case 3 is a case where the voice-enabled apparatus 100 determines the situation by communicating with an external IoT apparatus or the like. The case 3 is a case where a change in the situation of the user or external environment has been detected from information acquired from various kinds of IoT apparatuses connected to the voice-enabled apparatus 100 via a network, so that the user is expected to execute a next action with use of a voice command. In the case 3, the information processing device 110 determines the situation acquired by the external apparatus 200 and goes into a state of being able to receive a voice command appropriate for the determined situation.

Figure 8:
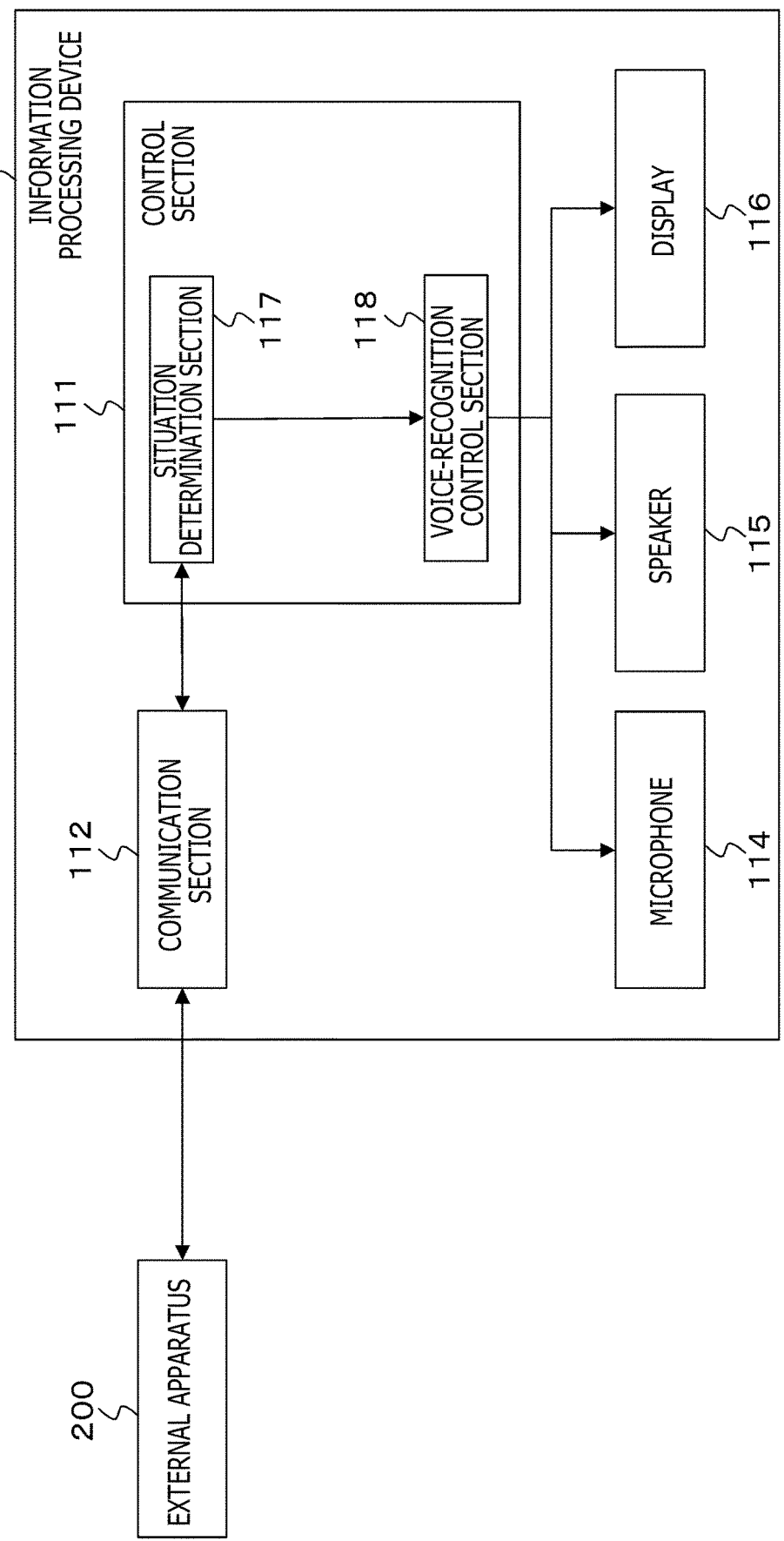
FIG. 8 is a block diagram depicting an example of a configuration of an information processing device corresponding to a case 3.

FIG. 8 illustrates an example of a configuration of the information processing device 110 corresponding to the case 3. The information processing device 110 includes the control section 111, the communication section 112, the microphone 114, the speaker 115, and the display 116. In FIG. 8, the components corresponding to those illustrated in FIG. 2 are denoted by the same reference signs, and detailed description of these components will be omitted. The case 3 does not use the sensor section 113 included in the information processing device 110 illustrated in FIG. 2.

The case 3 can be any of the following use cases.

(1) A case where a visitor has arrived at the entrance (information acquired by the IoT security camera), so that the video on the IoT security camera is expected to be displayed on the display of the TV.

In the use case (1), a probable voice command appropriate for the situation is, for example, "Display the video on the camera at the entrance."

In this case, the control section 111 may perform such a process as outputting a notification to the display 116 or outputting a voice notification from the speaker 115 on the basis of the information acquired from the external IoT apparatus or the like. The control section 111 may then receive only voice commands related to these outputted notifications. Similarly, in the case 1, a notification based on a change in the situation of the application function may be outputted, and only voice commands based on the notification may be received.

[Case 4]

The case 4 is a case where the voice-enabled apparatus 100 determines a situation from a combination of the pieces of information used in the above-mentioned cases 1 to 3. The case 4 is a case where a change in the situation of the user or external environment has been detected by integrating the following: the information of the functions owned by the voice-enabled apparatus 100; the information acquired from the camera or various kinds of sensors owned by the voice-enabled apparatus 100; and the information acquired by the various kinds of IoT apparatuses connected to the voice-enabled apparatus 100 via a network, so that the user is expected to execute the next action with use of a voice command.

In the case 4, the information processing device 110 integrally determines the following: the situation of the application function section; the situation acquired by the sensor section 113; and the situation acquired by the external apparatus 200. The information processing device 110 then goes into a state of being able to receive a voice command appropriate for the determined situation.

Figure 9:
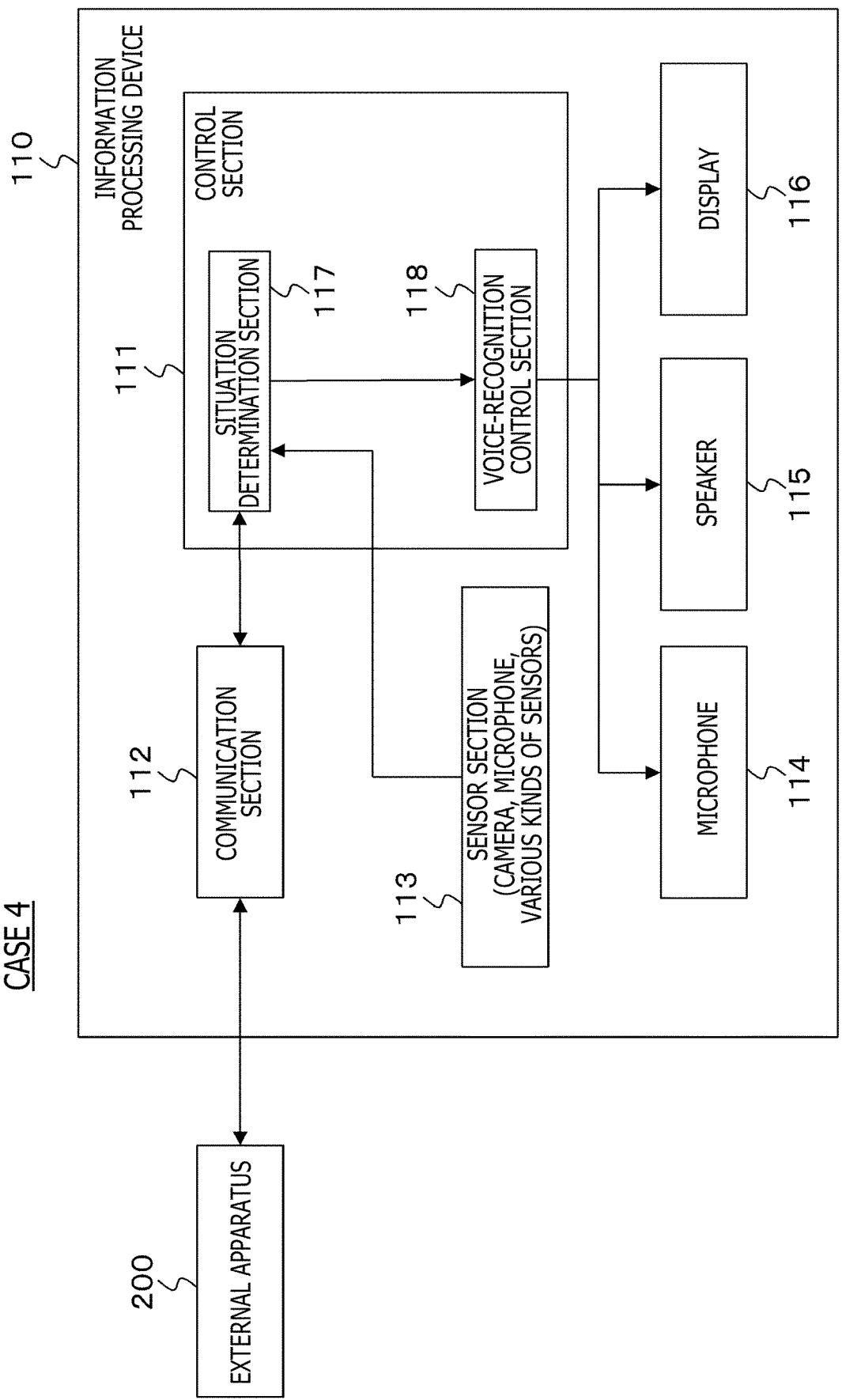
FIG. 9 is a block diagram depicting an example of a configuration of an information processing device corresponding to a case 4.

FIG. 9 illustrates an example of a configuration of the information processing device 110 corresponding to the case 4. The information processing device 110 includes the control section 111, the communication section 112, the sensor section 113, the microphone 114, the speaker 115, and the display 116. In FIG. 9, the components corresponding to those illustrated in FIG. 2 are denoted by the same reference signs, and detailed description of these components will be omitted. The case 4 uses all components included in the information processing device 110 illustrated in FIG. 2.

As described above, in the information processing system 10 illustrated in FIG. 1, the voice-enabled apparatus 100 automatically goes into a state of being able to receive a voice command appropriate for the determined situation. Hence, the user 300 can utter a voice command without performing a user action to prevent false recognition, such as the utterance of a wake word. This can reduce the troublesomeness and burden of the user 300.

Further, in the information processing system 10 illustrated in FIG. 1, the voice-enabled apparatus 100 informs the user 300, by means of display or voice output, what a voice command appropriate for the situation is, or in other words, what a receivable voice command is. As a result, the user 300 can properly perform the utterance of a voice command appropriate for the situation.

In the respective cases, the control section may control the information determination made by the situation determination section, on the basis of settings selected by the user in advance or information accumulated according to user actions performed so far. For example, the case 1 can include, for example, a process of starting a voice-receiving process at nine o'clock in a case where the user has previously set to watch a program starting at nine o'clock, or a process of starting a voice-receiving process in a case where it has been confirmed on the basis of sensor information that the user has sat in front of the TV at the start time of a program the user regularly watches. Incidentally, such information as the settings selected by the user and his/her action history may be stored inside the voice-enabled apparatus 100 or recorded in an unillustrated external recording apparatus, such as a cloud server.

Note that the effects described in the present specification are mere examples and there can be additional effects.

<2. Application to Mobile Body>

The technology according to the present disclosure (the present technology) can be applied to various products. For example, the technology according to the present disclosure may be achieved as an apparatus to be mounted in any kinds of mobile bodies, such as an automobile, an electric vehicle, a hybrid electric vehicle, a motorcycle, a bicycle, a personal mobility, an airplane, a drone, a ship, or a robot.

Figure 10:
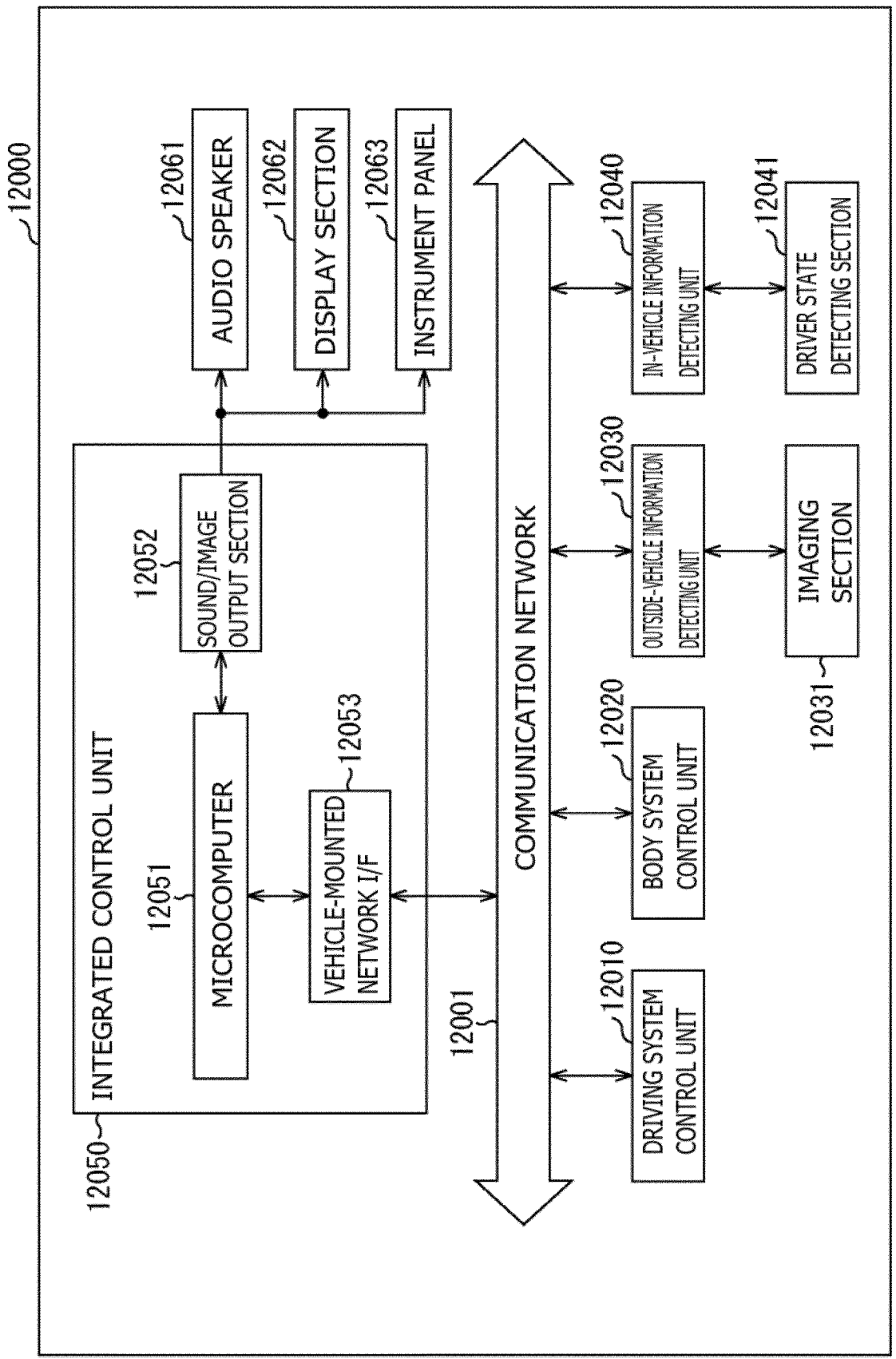
FIG. 10 is a block diagram depicting an example of schematic configuration of a vehicle control system.

FIG. 10 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 10, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automatic driving, which makes the vehicle to travel autonomously without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 10, an audio speaker 12061, a display section 12062, and an instrument panel 12063 are illustrated as the output device. The display section 12062 may, for example, include at least one of an on-board display and a head-up display.

Figure 11:
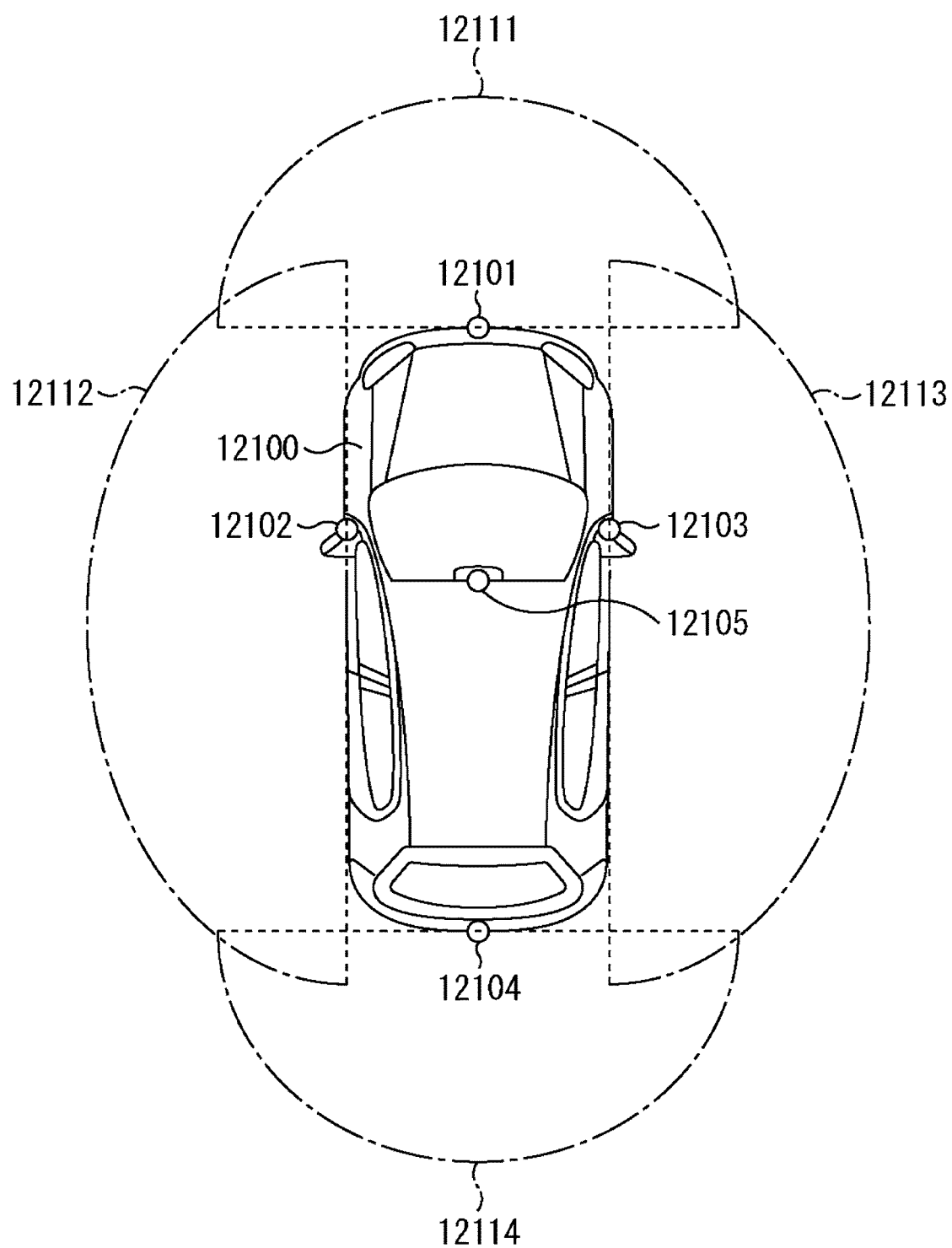
FIG. 11 is a diagram of assistance in explaining an example of installation positions of an outside-vehicle information detecting section and an imaging section.

FIG. 11 is a diagram depicting an example of the installation position of the imaging section 12031.

In FIG. 11, the imaging section 12031 includes imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 11 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automatic driving that makes the vehicle travel autonomously without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

An example of the vehicle control system to which the technology of the present disclosure can be applied has been described above. The technology according to the present disclosure can be applied, for example, to the integrated control unit 12050 among the components of the above-described configuration. Applying the technology according to the present disclosure to the integrated control unit 12050 in a case where the user performs a voice operation in the vehicle control system 12000, the user can utter a voice command without performing a user action to prevent false recognition, such as the utterance of a wake word. This reduces the troublesomeness and burden of the user. Moreover, a car navigation system mounted in, for example, a vehicle may be used as the external apparatus 200. Further, the audio speaker 12061 or the display section 12062 of the vehicle control system 12000 may be controlled on the basis of the situation determination process in the control section of the car navigation system.

3. Modified Example

The preferred embodiment of the present disclosure has been described in detail with reference to the attached drawings. However, the technical scope of the present disclosure is not limited to the embodiment. It will be understood by those skilled in the art that various kinds of changes and modifications may be made within the scope of the technical idea described in the scope of claims. Also, it will naturally be understood by those skilled in the art that these changes and modifications also belong to the technical scope of the present disclosure.

Furthermore, the technology can also have the following configurations.

(1) An information processing device including: a control section that controls a process of determining a situation, to put a voice command appropriate for the determined situation into a receivable state.

(2) The information processing device according to the above (1), in which the control section controls determination of a situation of an application function, and the situation includes the determined situation of the application function.

(3) The information processing device according to the above (2), in which the application function includes an application function of a smart television or a smart speaker.

(4) The information processing device according to any one of the above (1) to (3), further including:
a sensor section, in which
the situation includes a situation acquired by the sensor section.

(5) The information processing device according to the above (4), in which the sensor section includes a camera.

(6) The information processing device according to the above (4) or (5), in which the situation includes a situation of a user.

(7) The information processing device according to any one of the above (1) to (6), further including:
a communication section that communicates with an external apparatus, in which
the situation includes a situation acquired by the external apparatus.

(8) The information processing device according to any one of the above (1) to (7), further including:
a command executor that executes an entered voice command in a case that the entered voice command is a voice command appropriate for the situation.

(9) The information processing device according to any one of the above (1) to (8), further including:
a command notifier that notifies the user of a voice command appropriate for the situation.

(10) An information processing method including:
a procedure of determining a situation; and
a procedure of putting a voice command appropriate for the determined situation into a receivable state.

REFERENCE SIGNS LIST

10: Information processing system
100: Voice-enabled apparatus
110: Information processing device
111: Control section
112: Communication section
113: Sensor section
114: Microphone
115: Speaker
116: Display
117: Situation determination section
118: Voice-recognition control section
200: External apparatus
300: User
400: Television set (TV)

The invention claimed is:
1. A television comprising:
circuitry configured to
acquire situation information from an external apparatus;
determine, using the acquired situation information, a situation;
automatically put, into a receivable state, a voice command appropriate only for the determined situation without a television user action performed while visually and audibly notifying a television user of the voice command appropriate for the determined situation; and
wherein
the visual notification to the television user is displayed on the television in a visually recognizable manner and the audible notification is through a speaker in an auditorily recognizable manner, and
the television user action is a button pressing operation function or an utterance of a wake expression for reception of the voice command.

2. The television according to claim 1, wherein the circuitry is configured to determine a situation of an application function, and the situation includes the determined situation of the application function.

3. The television according to claim 2, wherein the application function includes an application function of a smart television or a smart speaker.

4. The television according to claim 1, wherein the circuitry is configured to sense a situation, wherein the situation includes a situation sensed by a sensor circuitry.

5. The television according to claim 4, wherein the situation includes a situation of a user.

6. The television according to claim 1, wherein the external apparatus includes a camera.

7. The television according to claim 1, wherein the circuitry is configured to execute a voice command in a case that the voice command is the voice command appropriate for the situation.

8. The television according to claim 1 wherein in a case when the voice command appropriate for the determined situation is not a command that the television user intends to utter, the television will respond to the wake expression.

9. The television according to claim 1, wherein the external apparatus is an Internet of Things apparatus.

10. The television according to claim 1, wherein the circuitry is configured to employ an interactive Artificial Intelligence assistant.

11. A television operational method comprising:
acquire situation information from an external apparatus;
determine, using the acquired situation information, a situation;
automatically put, into a receivable state, a voice command appropriate only for the determined situation without a television user action performed while visually and audibly notifying a television user of the voice command appropriate for the determined situation; and
wherein
the visual notification to the television user is displayed on the television in a visually recognizable manner and the audible notification is through a speaker in an auditorily recognizable manner, and
the television user action is a button pressing operation function or an utterance of a wake expression for reception of the voice command.

12. The television operational method according to claim 11 wherein in a case when the voice command appropriate for the determined situation is not a command that the television user intends to utter, the television will respond to the wake expression.

13. The television operational method according to claim 11, wherein the situation includes the determined situation of an application function.

14. The television operational method according to claim 13, wherein the application function includes an application function of a smart television or a smart speaker.

15. The television operational method according to claim 11, wherein the situation includes a situation sensed by a sensor circuitry.

16. The television operational method according to claim 15, wherein the situation includes a situation of a user.

17. The television operational method according to claim 11, wherein the external apparatus includes a camera.

18. The television operational method according to claim 11, further comprising executing a voice command in a case that the voice command is the voice command appropriate for the situation.

19. The television operation method according to claim 11, wherein the external apparatus is an Internet of Things apparatus.

20. The television operation method according to claim 11, wherein the voice command appropriate for the determined situation is recognized through processing utilizing cloud services.

\* \* \* \* \*